(12) United States Patent
Johnson

(10) Patent No.: US 11,551,676 B2
(45) Date of Patent: Jan. 10, 2023

(54) TECHNIQUES FOR DIALOG PROCESSING USING CONTEXTUAL DATA

(71) Applicant: Oracle International Corporation, Redwood Shores, CA (US)

(72) Inventor: Mark Edward Johnson, Sydney (AU)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 17/003,250

(22) Filed: Aug. 26, 2020

(65) Prior Publication Data

US 2021/0082414 A1    Mar. 18, 2021

Related U.S. Application Data

(60) Provisional application No. 62/899,649, filed on Sep. 12, 2019.

(51) Int. Cl.
  *G10L 15/19* (2013.01)
  *G06F 16/9032* (2019.01)
  *G10L 15/22* (2006.01)

(52) U.S. Cl.
  CPC ........ *G10L 15/19* (2013.01); *G06F 16/90332* (2019.01); *G10L 15/22* (2013.01); *G10L 2015/227* (2013.01)

(58) Field of Classification Search
  USPC ................ 704/231, 246, 247, 251, 252, 275
  See application file for complete search history.

(56) References Cited

U.S. PATENT DOCUMENTS

| | | | |
|---|---|---|---|
| 2006/0074980 A1* | 4/2006 | Sarkar | G06F 16/958 |
| 2007/0011155 A1 | 1/2007 | Sarkar | |
| 2007/0050191 A1 | 3/2007 | Weider et al. | |
| 2007/0271340 A1 | 11/2007 | Goodman et al. | |
| 2014/0025377 A1 | 1/2014 | Koch et al. | |
| 2018/0285595 A1* | 10/2018 | Jessen | G06F 21/6245 |

(Continued)

OTHER PUBLICATIONS

Banarescu et al., "Abstract Meaning Representation for Sembanking", Proceedings of the 7th Linguistic Annotation Workshop and Interoperability with Discourse, Aug. 2013, 9 pages.

(Continued)

*Primary Examiner* — Leonard Saint-Cyr
(74) *Attorney, Agent, or Firm* — Kilpatrick Townsend & Stockton LLP

(57) ABSTRACT

Techniques are described for using data stored for a user in association with context levels to improve the efficiency and accuracy of dialog processing tasks. A dialog system stores historical dialog data in association with a plurality of configured context levels. The dialog system receives an utterance and identifies a term for disambiguation from the utterance. Based on a determined context level, the dialog system identifies relevant historical data stored to a database. The historical data may be used to perform tasks such as resolving an ambiguity based on user preferences, disambiguating named entities based on a prior dialog, and identifying previously generated answers to queries. Based on the context level, the dialog system can efficiently identify the relevant information and use the identified information to provide a response.

18 Claims, 8 Drawing Sheets

(56) References Cited

U.S. PATENT DOCUMENTS

2019/0042988 A1* 2/2019 Brown .................. G06N 5/022
2020/0279075 A1* 9/2020 Avedissian ............ G06V 10/82

OTHER PUBLICATIONS

Liang, "Lambda Dependency-Based Compositional Semantics", Artificial Intelligence, Sep. 18, 2013, 7 pages.

Yin et al., "A Syntactic Neural Model for General-Purpose Code Generation", Proceedings of the 55th Annual Meeting of the Association for Computational Linguistics, vol. 1, Apr. 6, 2017, 14 pages.

International Application No. PCT/US2020/048153, International Search Report and Written Opinion, dated Dec. 1, 2020, 13 pages.

* cited by examiner

500

```
┌─────────────────────────────────────────────────┐
│ IDENTIFY STORED DATA FOR A PLURALITY OF PRIOR   │
│    DIALOGS WITH THE USER FROM THE DATABASE      │
│                      502                        │
└─────────────────────────────────────────────────┘
                         │
                         ▼
┌─────────────────────────────────────────────────┐
│   ANALYZE THE IDENTIFIED DATA TO COMPUTE THE VALUE │
│                      504                        │
└─────────────────────────────────────────────────┘
                         │
                         ▼
┌─────────────────────────────────────────────────┐
│     STORE THE COMPUTED VALUE TO THE DATABASE    │
│                      506                        │
└─────────────────────────────────────────────────┘
```

FIG. 5

TECHNIQUES FOR DIALOG PROCESSING USING CONTEXTUAL DATA

CROSS-REFERENCE TO RELATED APPLICATIONS

The present application claims the benefit and priority under 35 U.S.C. 119(e) of U.S. Application No. 62/899,649, filed on Sep. 12, 2019, entitled "CONTEXT-BASED DIALOG TECHNIQUES," the content of which is herein incorporated by reference in its entirety for all purposes.

TECHNICAL FIELD

The present disclosure relates generally to dialog systems. More specifically, but not by way of limitation, this disclosure describes techniques for using levels of historical context to influence dialog tasks such as named entity linking and result ordering.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

Current dialog systems have a limited ability to leverage context. Systems exist that discern contextual information based on recent input. For example, some existing systems can resolve a pronoun by identifying a person named in the last sentence received by the system. However, in conventional systems, contextual information is underutilized.

BRIEF SUMMARY

The present disclosure relates generally to dialog systems. More particularly, techniques are described for using levels of historical context to influence dialog tasks such as named entity linking and result ordering. Various embodiments are described herein, including methods, systems, non-transitory computer-readable storage media storing programs, code, or instructions executable by one or more processors, and the like.

In certain embodiments, a dialog system receives, from a user, a spoken utterance. The dialog system processes the spoken utterance to identify a term for disambiguation. The dialog system determines a context level, of a plurality of predefined context levels, for the term for disambiguation. Based on the determined context level, the dialog system identifies a value for the term using a database storing a plurality of values for the user in association with the context level, and disambiguates the term using the identified value.

In some aspects, the dialog system further generates a logical form for the spoken utterance based on the disambiguated term, generates a response based on the logical form, and outputs the response to the user. In some aspects, the dialog system further identifies, from the database based on the logical form, a stored execution result, wherein the response is further generated based on the execution result.

In some aspects, the dialog system further stores a representation of the spoken utterance, the logical form, and the response to the database.

In some aspects, identifying the value includes, based on the determined context level, selecting the database for the context level, of a plurality of context-level-based databases, and querying the selected database with an identifier of the user and the term to identify the value. In some aspects, the dialog system further identifies, from the database, stored data for a plurality of prior dialogs with the user, and analyzes the identified data to compute the value. In some aspects, the plurality of predefined context levels include an immediate context, a short-term context, a medium-term context, and a long-term context.

Embodiments further include systems and computer-readable media (e.g., a non-transitory computer-readable memory) configured for performing the methods described herein.

The foregoing, together with other features and embodiments will become more apparent upon referring to the following specification, claims, and accompanying drawings.

BRIEF DESCRIPTION OF THE DRAWINGS

FIG. 5 is a simplified flowchart depicting a method for generating context-based values which may be used in the processing of FIGS. 3-4 according to certain embodiments.

DETAILED DESCRIPTION

Figure 1:
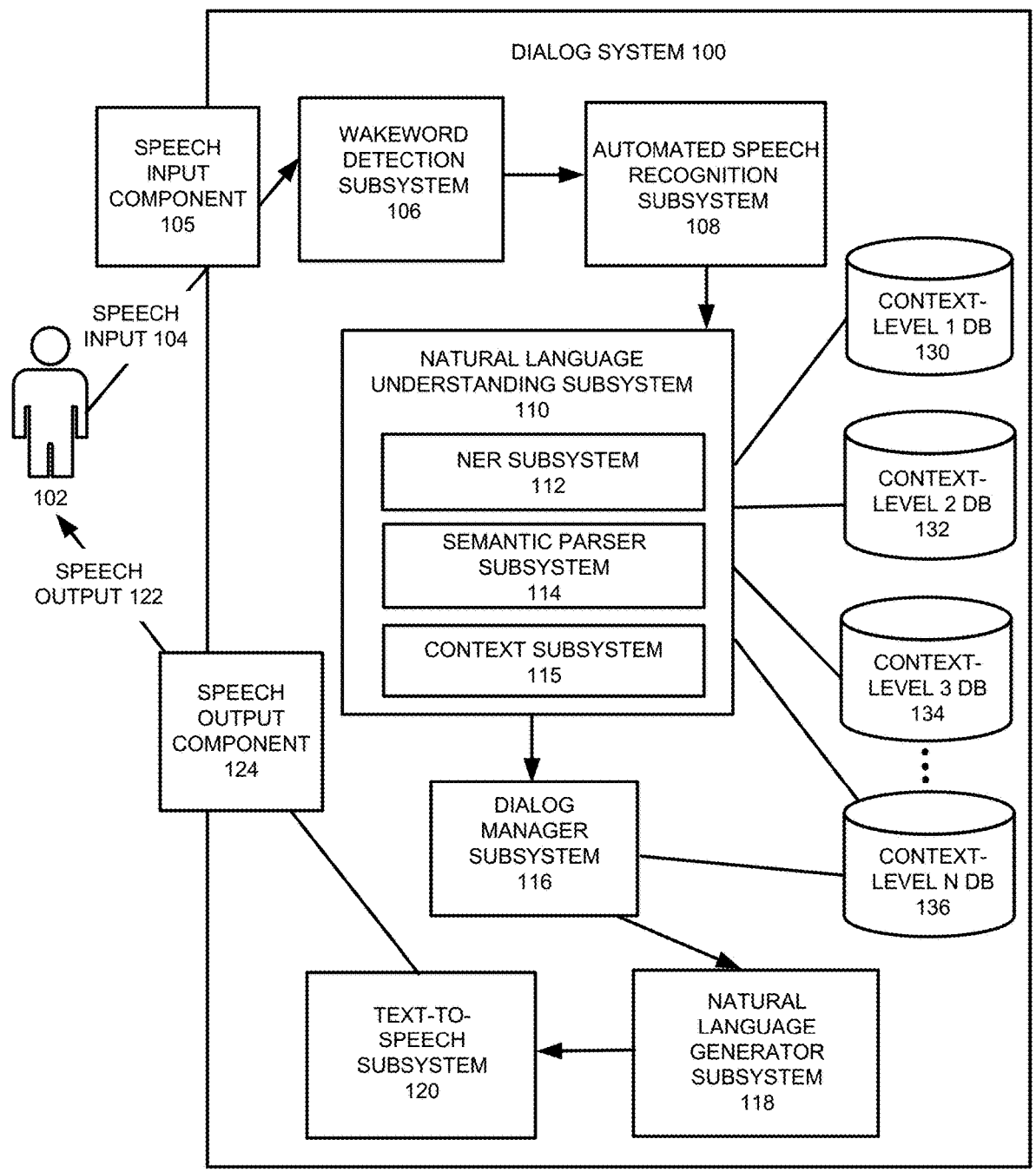
FIG. 1 is a simplified block diagram illustrating a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as exemplary is not necessarily to be construed as preferred or advantageous over other embodiments or designs.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system"). The dialog system is configured to receive voice or speech inputs, interpret the voice inputs, maintain a dialog, possibly perform or cause one or more actions to be performed based upon interpretations of the voice inputs, prepare appropriate responses, and output the responses to the user using voice or speech output.

As noted above, in conventional dialog systems, context is used in a very limited fashion. While conventional systems may keep track of very short term context (e.g., from a current dialog session), conventional dialog systems do not manage contextual data for users in a systematic fashion. As a result, conventional systems may require additional input and output to resolve ambiguities. For example, if a user says "My favorite airline," or "that guy I was talking to this morning," a conventional dialog system may be unable to access the necessary information to resolve the meaning of such user input. In such a case, the dialog system must request the necessary information, and receive and process a response, which increases the overall length of the dialog session and the time and computing resources required to answer a query.

Techniques described herein improve the efficiency of dialog processing tasks by using historical dialog data stored in association with different context levels for different users. Embodiments enable access to historical queries including associated contexts, logical forms, execution results, date and time, and other metadata. The dialog system disclosed herein may maintain information about users, such as what sort of health insurance they have, where they work, which airline they prefer to book, and so forth. The dialog system uses information based on context levels (e.g., the immediate, short-term, medium-term, and long-term context) to understand a user's request. The dialog system can track a series of different contexts and use those contexts as a source of preferences in understanding the user's requests. The dialog system can use this information to process requests involving contextual data (e.g., "call back the human resources (HR) representative that just called me") and also to indirectly influence the interpretation of the current request based on previously successful requests.

In some embodiments, when a user interacts with the dialog system, the dialog system can remember the user's previous preferences and use those preferences essentially as background assumptions. For example, the user asks the dialog system to book a flight. The dialog system has stored information indicating that the user previously chose to fly on a particular airline. When the system produces results, the system ranks flights on that particular airline higher than flights on other airlines.

In some embodiments, the system systematically personalizes results through named entity linking. Named entity linking may involve connecting named entities (e.g., people, things, etc.) with entries in a database. For example, a dialog system in a car receives speech input, "Take me to Starbucks®." The dialog system must select a particular Starbucks® of many potential locations. Connecting that word, Starbucks, to a particular instance of Starbucks® coffee shop is an example of using named entity linking to personalize a result, which may be achieved in an efficient fashion using contextual data as described herein.

In some embodiments, different levels of context are established, such as short-term, medium-term, and long-term. Short-term context may be used to reserve pronouns. Medium-term context may be used to answer requests like "Call back the person from human resources HR I was talking to this morning." Long-term context may include preferences such as whether a person loves or hates flying on a particular airline. Data for each of the context levels may be maintained and used in different manners.

In certain embodiments, the dialog system performs a disambiguation task to resolve an ambiguity. Such tasks may include named entity linking, when the user leaves out relevant details (e.g., "get me a flight to Tampa," without specifying an airline or date). The dialog system maintains a user-specific database of historical speech input and/or other data associated with the user, which can be used to determine various levels of context for resolving such ambiguities.

In some embodiments, the dialog system may make determinations (e.g., resolve an ambiguity) based on explicit and/or implicit preferences previously expressed by a user. An explicit preference may correspond to the user stating a word. An implicit preference can be expressed by the user selecting an item from a list of choices presented to the user, by the user visiting that place, etc.

FIG. 1 illustrates an example of a dialog system 100, according to some embodiments. The dialog system 100 is configured to receive voice or speech inputs 104 (also referred to as speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output.

In certain embodiments, the processing performed by a dialog system is implemented by a pipeline of components or subsystems, including a speech input component 105, a wake-word detection (WD) subsystem 106, an automatic speech recognition (ASR) subsystem 108, a natural language understanding (NLU) subsystem 110, which includes a named entity recognizer (NER) subsystem 112, a semantic parser subsystem 114, and a context subsystem 115, a dialog manager (DM) subsystem 116, a natural language generator (NLG) subsystem 118, a text-to-speech (TTS) subsystem 120, a speech output component 124, and one or more context-level databases (130-136). The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech-to-text conversion. The spoken speech or voice input may be in a natural language form, and the ASR subsystem 108 is configured to generate the corresponding natural language text in the language of the speech input. The voice input received by the ASR subsystem 108 may include one or more words, phrases, clauses, sentences, questions, etc. The ASR subsystem 108 is configured to generate a text utterance for each spoken clause and feed the text utterances to the NLU subsystem 110 for further processing.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form.

In certain implementations, the NLU subsystem 110 includes a named entity recognizer (NER) subsystem 112 and a semantic parser (SP) subsystem 114. The NER subsystem 112 performs named entity linking by matching a named entity to a unique identity. Named entity linking can be considered a disambiguation task, in that it involves identifying an appropriate identity of a set of possible identities corresponding to a given named entity. For example, the named entity "Erik Erickson" can be linked to one of several identities including Erik Erikson the developmental psychologist, Erik Erikson the television pundit, Eric Ericson the conductor, and Eric Ericson the actor. Based on context, the appropriate identity can be discerned. For example, the NLU subsystem 110 receives the speech input, "Find books by Erik Erikson." The NLU subsystem 110 may determine that, of the possible Erik Eriksons, the developmental psychologist is the one that wrote multiple books. Accordingly, the named entity "Erik Erikson" is linked to Erik Erikson the developmental psychologist.

The NER subsystem 112 receives a text utterance as input, identifies named entities in the text utterance, and tags the text utterance with information related to the identified named entities. The tagged text utterances are then fed to the SP subsystem 114, which is configured to generate a logical form for each tagged text utterance (or for a series of tagged text utterances). The logical form generated for an utterance may identify one or more intents corresponding to the text utterance. An intent for an utterance identifies an objective of the utterance. Examples of intents include "order pizza" and "find directions." An intent may, for example, identify an action that is requested to be performed.

In addition to intents, a logical form generated for a text utterance may also identify slots (also referred to as parameters or arguments) for the identified intent. A slot is a predefined attribute, which may be an argument of one or more intents. Slots may be labeled by the NLU subsystem 110 and matched to entities or other pieces of information. For example, the city "Moscow" may match a particular slot based on context, such as toloc.city_name if someone is buying a flight to Moscow, fromloc.city_name if someone is buying a flight from Moscow, and so forth. Slot filling can be considered a sequence labeling problem and solved using techniques such as recurrent neural networks. For example, for the speech input "I'd like to order a large pepperoni pizza with mushrooms and olives," the NLU subsystem 110 can identify the intent order pizza. The NLU subsystem 110 can also identify and fill slots, e.g., pizza_size (filled with large) and pizza_toppings (filled with mushrooms and olives). The NLU subsystem 110 may use machine learning-based techniques, rules (which may be domain specific), or a combination of the two, to generate the logical forms. The logical forms generated by the NLU subsystem 110 are then fed to the DM subsystem 116 for further processing.

In some embodiments, the NLU subsystem 110 includes a context subsystem 115. The context subsystem 115 can determine a context for a term identified from a received utterance. A term may be a word, phrase, sentence, or group of words. Examples of terms include "that restaurant I went to last Friday," "coffee shop," and "my favorite airline." The context subsystem 115 can use the determined context to identify information to disambiguate the term and/or perform an action in association with the term, as described herein. Techniques for using context for dialog processing are described in further detail below with respect to FIGS. 3-4. In some embodiments, the context subsystem 115 is communicatively coupled to a plurality of context-level databases (e.g., context-level 1 database (DB) 130, context-level 2 DB 132, context-level 3 DB 134, . . . context-level N DB 136). The context subsystem 115 can retrieve useful information from a selected context-level database based on a determined context level.

The DM subsystem 116 is configured to manage a dialog with the user based upon logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user. In some embodiments, the DM subsystem 116 may utilize information stored to the context-level databases (e.g., context-level 1 DB 130, context-level 2 DB 132, context-level 3 DB 134, . . . context-level N DB 136) to perform such actions. For example, if the DM subsystem 116 has already identified the answer to a question, the DM subsystem 116 can retrieve the answer from the appropriate context-level database.

In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific. In certain embodiments, machine learning based techniques (e.g., machine learning models) may also be used. In some embodiments, a combination of rules and machine learning models may be used. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLU subsystem 110 and/or DM subsystem 116 may be communicatively coupled to a plurality of context-level-based databases (e.g., context-level 1 DB 130, context-level 2 DB 132, context-level 3 DB 134, . . . context-level N DB 136). Each context-level database 130-136 may store data designated for a particular context level, of a plurality of context levels. For example, the context levels may include immediate context, short-term context, medium-term context, and long-term context. The immediate context may correspond to the topic of a preceding request (e.g., within a dialog session). The short-term context may correspond to speech input within a dialog session (e.g., potentially earlier in the conversation than the preceding request). The medium-term context may correspond to specific things that the user is likely to remember and could specifically refer to (e.g., "the HR rep I spoke to this morning"). The long-term context may correspond to user preferences that the system has learned from prior conversations and user behavior (e.g., that the user prefers to fly on United States Airways). Storing the dialog history in association with context levels may speed up database queries by narrowing the search field to pertinent entries. For example, immediate context may be suitable for pronoun resolution, while longer-term context may be suitable for named entity lining or ranking results. Examples of the types of data stored in a context-level database are further described below with respect to FIG. 2.

In some embodiments, each context-level database is for data tied to a different type of context level. For example, the context-level 1 DB 130 is for immediate-term context-related data, the context-level 2 DB 132 is for short-term context-related data, the context-level 3 DB 134 is for medium-term context-related data, and the context-level N DB 136 is for long-term context-related data. The context-level 1 DB 130 may be used to store data from the current dialog session (e.g., the last speech input received). Upon evaluating such data, it may be moved to and/or copied to a longer-term database. For example, after a dialog session terminates, the data related to that dialog session is deleted from the context-level 1 DB 130 and stored to the context-level 2 DB 132. Data may further be copied to and/or moved to a longer-term database based on information discerned by the dialog system 100. For example, if data in the context-level 2 DB 132 is determined to be relevant to general user preferences, such data may be stored to the context-level N DB 136.

Alternatively, or additionally, the dialog system 100 may store the dialog history to the database in association with context levels in a different manner (e.g., without the use of separate databases). For example, dialog history data may be tagged with a context level, a pointer may specify the context level, or other suitable means for organizing the historical data by context level.

In some implementations, the dialog system 100 may manage contexts for different "dimensions." For example, time is one dimension, and "utterance-level," "conversation-level," "short," "mid," etc. are contexts along the time dimension. Context may also be identified and used along other dimensions, such as geography. Examples of geographical context include "local geography", "city-level," "state-level," country-level," etc.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

Figure 2:
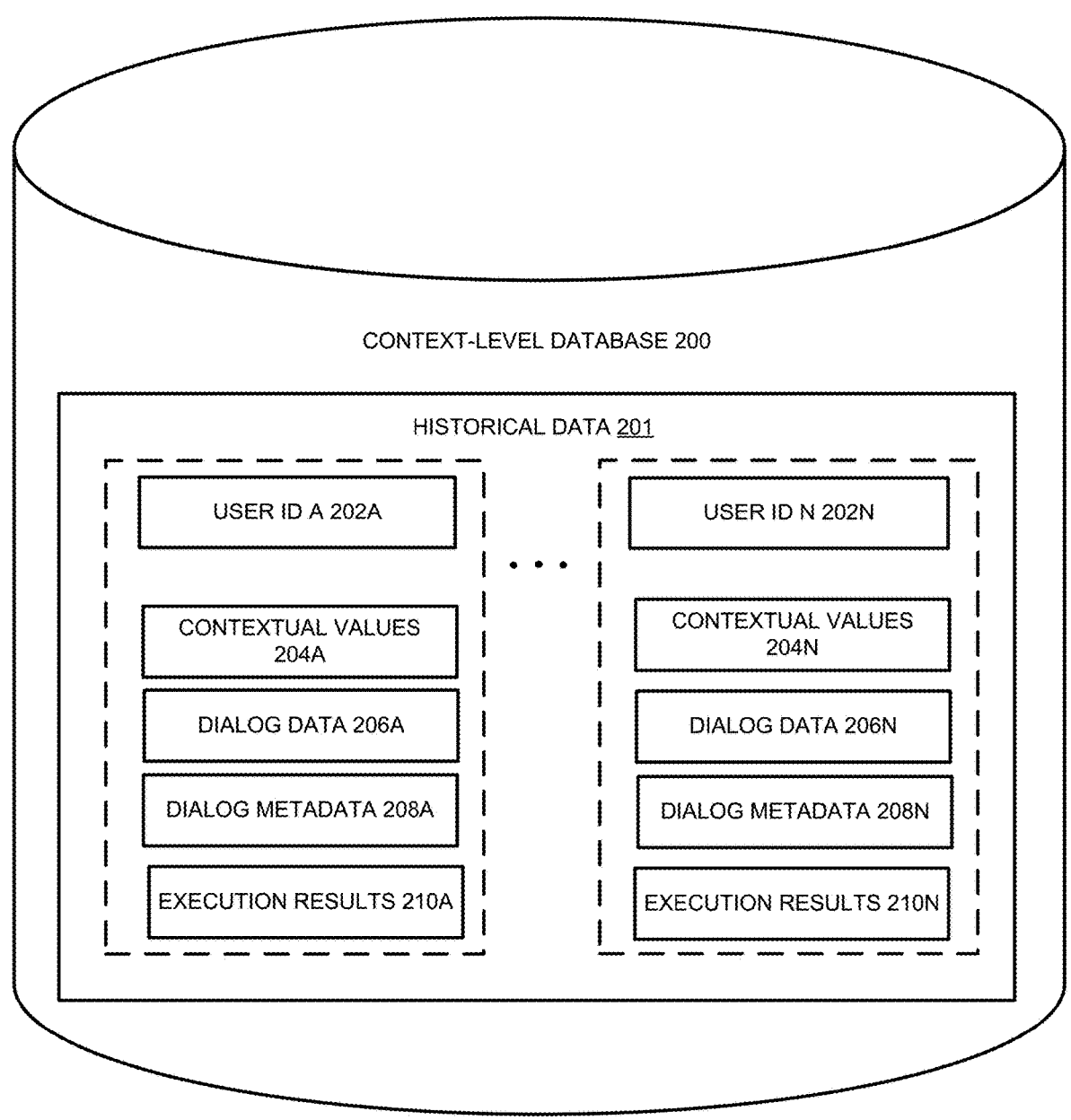
FIG. 2 is a simplified block diagram illustrating a context-level database of the dialog system of FIG. 1 according to certain embodiments.

FIG. 2 illustrates an example of a context-level database 200 (e.g., context-level 1 DB 130, context-level 2 DB 132, context-level 3 DB 134, or context-level N DB 136 of FIG. 1). As described above with respect to FIG. 1, the dialog system 100 may include or be communicatively coupled to a plurality of context-level databases (e.g., context-level 1 DB 130, context-level 2 DB 132, context-level 3 DB 134, ... context-level N DB 136) storing historical data 201 for different context-levels, such as immediate context, short-term context, medium-term context, and so forth.

In some embodiments, the context-level database 200 is a storage unit and/or device (e.g., a file system, database, collection of tables, or other storage mechanism) for storing data related to prior dialog sessions. The context-level database 200 may include multiple different storage units and/or devices. The context-level database 200 may be local to the dialog system 100 (e.g., local storage) and/or connected to the dialog system 100 over a network (e.g., cloud storage).

The context-level database 200 may store historical data 201 pertaining to user dialogs. The historical data 201 may include user identifiers (IDs) (user ID (user ID A 202A, . . . user ID N 202N), contextual values (204A, . . . 204N), dialog data (206A, . . . 206N), dialog metadata (208A, . . . 208N), and execution results (210A, . . . 210N).

In some embodiments, the historical data 201 is stored in association with a particular user and may be indexed with a user ID (e.g., user ID A 202A . . . user ID N 202N). A user ID is an identifier of an individual, such as a name, an alphanumerical identifier, a nickname, and so forth. For a given user, contextual values (204A, 204N), dialog data (206A, 206N), dialog metadata (208A, 208N), and execution results (210A, 210N) may be stored to the context-level database 200 in association with the corresponding user ID.

The contextual values (e.g., contextual values 204A, . . . contextual values 204N) may include information that the dialog system 100 has learned in the course of prior dialog sessions with a particular user. For example, in the long-term, the dialog system 100 may learn that a particular user's favorite restaurant is Sue's Diner in Boise, Id. In the medium term, the dialog system 100 may learn that, in the last week, a particular user had meetings with John Jones on Wednesday and Tiffany Smith on Friday. Such information can be stored as contextual values (204A, 204N).

In some embodiments, the contextual values (204A, 204N) are stored as values of key-value pairs. For example, the key "That coffee shop I went to yesterday" is stored in association with the value "Beach Beans in Key West, Florida," and "favorite airline" is stored in association with the value "United®." Additional examples of key-value pairs include Name=Sam, Color=Red, Book=Bible, etc. The "key" is an attribute and the "value" is the value for that attribute. The keys may be stored as vector representations of terms in some embodiments to facilitate matching with data processed by the dialog system 100.

In some implementations, the contextual values (204A, 204N) may further include contextual information from other sources (e.g., in addition to dialog history data). Such contextual values (204A, 204N) may include user preferences and activities obtained from employment records, Internet cookies, location tracking data, and so forth. For example, the dialog system 100 may be linked to an email server from which the dialog system retrieves emails of the user. As another example, the dialog system 100 may obtain and store a user's Internet search history. As additional examples, the dialog system 100 may obtain and store activity-based records associated with a user such as employee records, medical records, and/or a purchase history.

In some embodiments, the dialog data (206A, 206N) includes information stored in connection with prior dialog sessions. The dialog data (206A, 206N) may include historical queries received by the dialog system 100, as well as responses provided by the dialog system 100. For example, a dialog session transpires as follows:

USER SPEECH INPUT: Book me a flight to Cincinnati.
DIALOG SYSTEM OUTPUT: OK, what day?
USER SPEECH INPUT: July 10
DIALOG SYSTEM OUTPUT: Do you prefer morning, afternoon, or evening?
USER SPEECH INPUT: Afternoon.
DIALOG SYSTEM OUTPUT: OK, I have a flight on Ohio Airlines at 2 PM.
USER SPEECH INPUT: I prefer United States Airways.
DIALOG SYSTEM OUTPUT: Alright, let's do United States Airways at 3:30.

The dialog system 100 stores, to the context-level database 200, logs of the dialog to the context-level database 200 in association with the user. The dialog system 100 may update the context-level database 200 as additional dialogs are conducted. For example, the dialog system 100 may store, to the context-level database 200, historical data 201 corresponding to multiple dialogs with a particular user.

The dialog data (206A, 206N) for each user may include text utterances or other representations generated based on spoken utterances received from the user over the course of many dialog sessions (e.g., over days or years). The dialog data (206A, 206N) may further include logical forms. For example, based on a given utterance in a prior dialog session, the dialog system may generate and store a logical form that the dialog system 100 has generated based on the utterance.

In some embodiments, the dialog metadata (208A, 208N) is metadata associated with historical dialog sessions. Dialog metadata (208A, 208N) may include the date, time, location, receiving device (e.g., car, phone, smart television, and so forth), etc. For given dialog data 206A, corresponding dialog metadata 208A may be mapped to the dialog data 206A, directly, or by way of related user ID A 202A.

In some embodiments, the execution results (210A, 210N) include information retrieved based on a historical query. A given execution result 210A may be mapped to the corresponding dialog metadata 208A, dialog data 206A, contextual values 204A, and user identifier 202A. As an example, the dialog data 206A includes a historical query "How tall is the Statue of Liberty?". Based on the historical query, the dialog system 100 previously performed an Internet search and identified the execution result 210A "305 feet." Such execution results (210A, 210N) may be stored to the context-level database 200 in association with the related data 202A-208N to speed up future queries.

Figure 3:
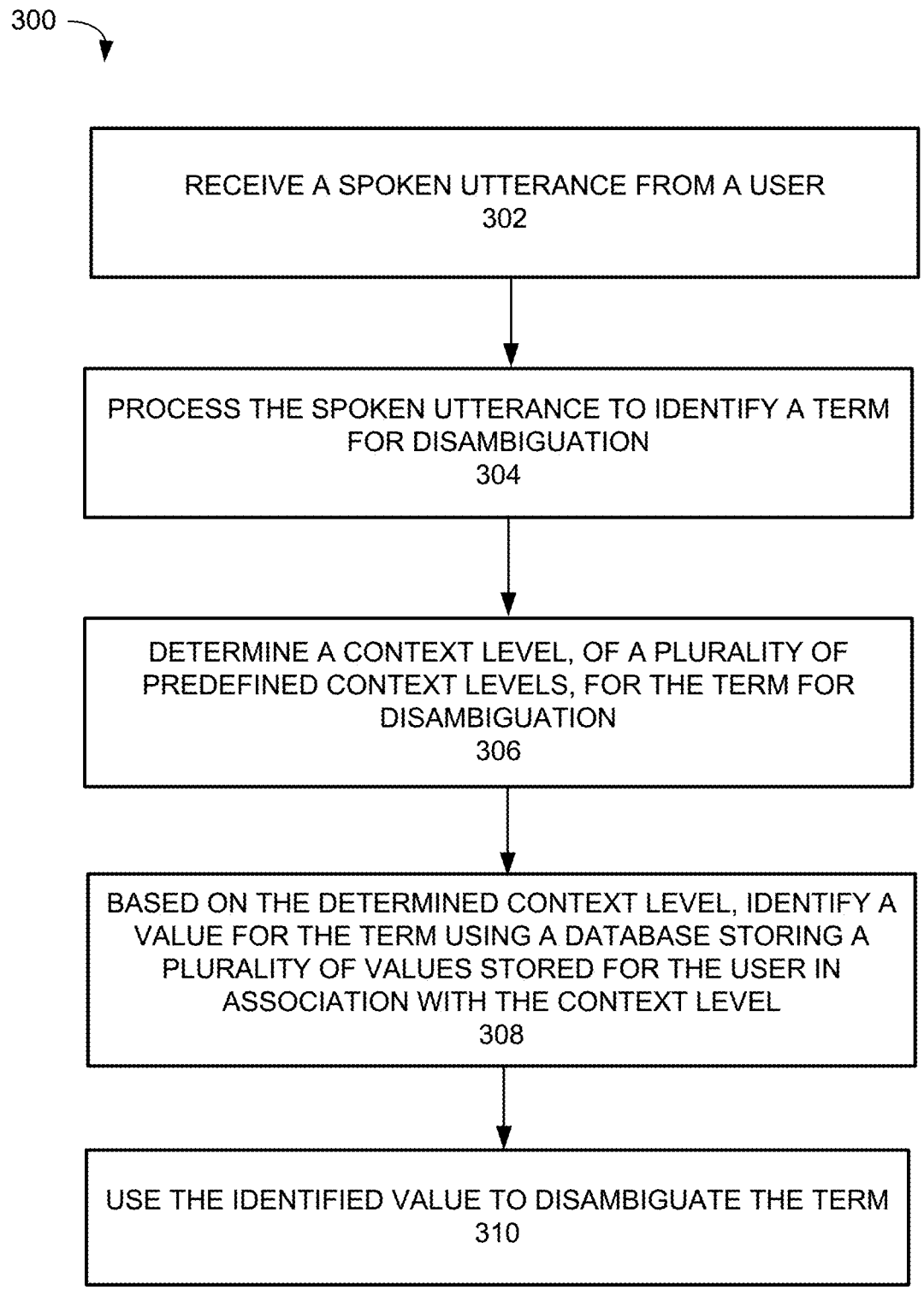
FIG. 3 is a simplified flowchart depicting a method for context-based dialog processing according to certain embodiments.

FIG. 3 depicts a simplified flowchart illustrating a method for context-based dialog techniques. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by the NLU subsystem 110 and other components of the dialog system 100 described above.

At 302, the dialog system receives a spoken utterance from a user. The dialog system may receive the spoken utterance, for example, from the user via the speech input component 105. The spoken utterance may be received as a wave form. The spoken utterance may be in a particular language and be in a natural language query form. The spoken utterance may specify a question that the user wants the dialog system to answer, specify one or more actions that the user wants the dialog system to initiate (e.g., "I would like a medium pepperoni pizza."), and the like.

In certain embodiments, instead of receiving a speech input (as in 302), input may be received in text form, for example, when a user types in text during a chat with a dialog system. The techniques described in this disclosure can be used with systems that receive input in the form of spoken speech, or text input, or combinations thereof.

At 304, the dialog system processes the spoken utterance to identify a term for disambiguation. A term may be a word or group of words that together convey an idea. Examples of a "term" as used herein include "diner," "that coffee shop I went to this morning," "him," "my boss," "my wife," and "my favorite bar." Processing the spoken utterance may include generating (e.g., by the ASR subsystem 108) a text utterance based upon the spoken utterance. The ASR subsystem 108 may pass a generated text utterance to the NLU subsystem 110 for further processing. The NLU subsystem may then initiate generating a logical form for the text utterance. The NLU subsystem may begin identifying words and performing named entity linking, slot filling, and other tasks.

In the course of such processing, the NLU subsystem may identify certain terms that are associated with an ambiguity. For example, the term "she" may have an ambiguous interpretation, as the term "she" could refer to various different individuals that the user providing speech input has previously mentioned. As another example, the term "that cafe I went to on Thursday" may have an ambiguous meaning, as the cafe at issue is not apparent from the current speech input. As another example, the term "my favorite ice cream" may have an ambiguous meaning, as the user's favorite ice cream is not apparent from the current speech input.

At 306, the dialog system (e.g., the context subsystem 115) determines a context level, of a plurality of predefined context levels, for the term for disambiguation. The context subsystem 115 may determine the context level based on the term for disambiguation identified at 304 and/or other words in the spoken utterance processed at 304. The context subsystem 115 may determine the context level using a machine learning model and/or rules. For example, if particular key words indicate that the context is medium-term (e.g., "last week," "Thursday," etc.), then the context level is determined to be medium-term. As another example, if the utterance indicates an overall preference or characteristic of the user is to be identified (e.g., by including terms such as "my favorite," "my doctor," "my assistant," etc.), then the context level is determined to be long-term.

In some cases, the dialog system may iterate through context levels as needed (e.g., the dialog system may preliminarily assign a context level of short-term, and if no relevant data is identified in the short-term context-level database, the dialog system may reassign the context level as medium-term, and so forth.

At 308, the dialog system (e.g., the context subsystem 115) identifies a value for the term based on the context level determined at 306. The context subsystem 115 identifies the value for the term using a database storing a plurality of values for the user in association with the context level. In some embodiments, as illustrated in FIG. 1, the dialog system includes, or is communicatively coupled to, a plurality of databases, each for a different context level. In such implementations, the context subsystem 115 selects the database for the context level identified at 306. For example, if the context level determined at 308 is medium-term, then the dialog system identifies a database for medium-term context-level data.

The context subsystem 115 may query the selected database with an identifier of the user and the term to identify the value. The context subsystem 115 may, for example execute a SQL query with parameters including the term for disambiguation (e.g., a key of a key-value pair). The query may further include an identifier of the user and one or more additional words identified from the spoken utterance.

In some embodiments, the value identified at 308 is a contextual value (e.g., of the contextual values 204A, 204N) stored to the context-level database 200. The context subsystem 115 may identify a stored contextual value by querying the context-level database 200 using the term for disambiguation. In some embodiments, the contextual value is stored as part of a key-value pair. The key may be the term for disambiguation or a derivative thereof. The key may be used to formulate a query to retrieve the stored contextual value (e.g., the query may be: FIND value FOR key=favorite airline). In some cases, additional words or phrases from the received speech input may further be used to formulate the query (e.g., the query may be: FIND value FOR key=favorite airline AND location=US). This may be useful if different preferences are configured based on different contextual dimensions (e.g., if different domestic and international airline preferences are configured).

Alternatively, or additionally, in some implementations, the historical data 201 may be stored to a single database, or multiple databases that are not allocated for a particular context level. In such implementations, the context levels may be associated with the values using techniques such as using pointers to the data to indicate a context level for various historical data stored to the context-level database(s). In such implementations, rather than identifying a context-based database, the dialog system may identify the data in terms of the context using techniques such as including the context level as a parameter of the query to the database. For example, the dialog system may retrieve a stored contextual value using the query: FIND value FOR key=favorite airline AND context level=medium.

As noted above with respect to block 306, in some cases, the context subsystem 115 may iterate through context-levels in the course of identifying a particular value. For example, given the utterance, "Please book a ticket on my favorite airline," the dialog system is to disambiguate "favorite airline," i.e., determine a value for airline. First, the dialog system may consider the utterance-level context and be unable to find the value from stored utterance-level data. Next, the dialog system queries the database for conversation-level data. If the user has identified his favorite airline in the conversation, then potentially, the conversation-level context may be used to determine the value for favorite airline. Next, assuming that favorite airline cannot be determined at the conversation level, then the dialog system may query in turn for "a short" (defined by a time period such as 1-month), "middle" (e.g., 6 months), and "long" (e.g., 1 year) period contexts. For each period, the dialog system may query the appropriate database using the key "favorite airline" until one or more matching values are identified.

In some embodiments, rather than retrieving a stored contextual value, the NLU subsystem 110 may compute the value using other historical data 201 stored to the context-level database (e.g., dialog data (206A, 206N), dialog metadata (208A, 208N), and/or execution results (210A, 210N). The NLU subsystem 110 may use the historical data 201 to compute a value for disambiguating the term using statistical analysis and/or a machine learning model, as further described below with respect to FIG. 5.

At 310, the NLU subsystem 110 uses the value identified at 308 to disambiguate the term. In some cases, the value identified at 308 may directly be used to disambiguate the term. For example, the NLU subsystem 110 may disambiguate the term "coffee shop" based on the stored key-value pair: key=coffee shop, value="Joe's Coffee," by linking the term "coffee shop" to the named entity "Joe's Coffee."

In some embodiments, disambiguating the term may be performed by the NLU subsystem 110 in the context of named entity linking. For example, the term for disambiguation is the word "Moscow," and it is unclear from the immediate speech input whether the user is referring to Moscow, Russia or Moscow, Id. The NLU subsystem 110 determines that the user has routinely engaged in dialogs related to Moscow, Id. Accordingly, the NLU subsystem 110 links the term "Moscow" to the named entity Moscow, Id.

In some embodiments, disambiguating the term may be performed by the NLU subsystem 110 in the context of slot-filling. For example, the received spoken utterance does not explicitly include a value for a slot, but the user's history contains a large number of similar requests, all of which contain the same value for that slot. Accordingly, the NLU subsystem 110 proposes that value for the slot. As a specific example, if the user has routinely booked flights to New York in the past, but the current speech input does not specify a destination city, the system may fill a destination city slot with "New York" based on the historical data for that user identified from the database at 308.

In some embodiments, disambiguating the term may be performed by the NLU subsystem 110 in the context of ranking results. For example, the NLU subsystem 110 prepares to display multiple options to the user (e.g., multiple coffee shops in Bellevue). The NLU subsystem 110 may rank the coffee shops higher if the user has explicitly or implicitly expressed a preference for that coffee shop, as reflected in historical data identified from the database at 308.

In some embodiments, disambiguating the term may be performed by the NLU subsystem 110 in the context of pronoun and noun phrase reference resolution. For example, the term is "her," and the NLU subsystem 110 identifies a corresponding contact, Mom, based on immediate context in the database. The NLU subsystem 110 may provide a response to the speech input corresponding to the ranking of the results (e.g., provide the speech output "Mom's birthday is June 1" based on identifying a birthday based on linking "her" to "Mom" and looking up an associated birthday.

In some cases, in addition to the value identified at 308, the NLU subsystem 110 may use additional factors in disambiguating the term. For example, the NLU subsystem 110 may disambiguate the term using the value in conjunction with additional contextual dimensional factors (e.g., based on a temporal context as well as a geographic context). As a specific example, the NLU subsystem 110 may execute named entity linking based on a combination of location and contextual preferences (e.g., 60% location and 40% history in selecting a coffee shop). As another example, the utterance, "map a route to McDonalds®," will yield different answers depending upon whether the user it at work, at home, or traveling to a different city. Accordingly, in some embodiments, multiple contexts corresponding to different dimensions may be used by the dialog system to disambiguate the term.

In certain embodiments, at 304-306, the NLU subsystem 110 may identify multiple values corresponding to multiple respective context levels. In this case, disambiguating the term may include selecting one of the values or ranking the values. For example, the NLU subsystem 110 may use configured rules to select one of multiple potential values. As a specific example a rule may specify to select the value determined from the shortest-term context evaluated. If the user's short-term contextual data yields the value "Airline A" and the user's medium-term contextual data yields the value "Airline B", then, in one example Airline A may be selected because it is most current (i.e., the more recent context is used). Alternatively, a rule may specify to select the longest-term context since the long-term context uses the largest baseline of user data. In some other embodiments, the NLU subsystem 110 may output both airlines to the user and have the user select one.

Figure 4:
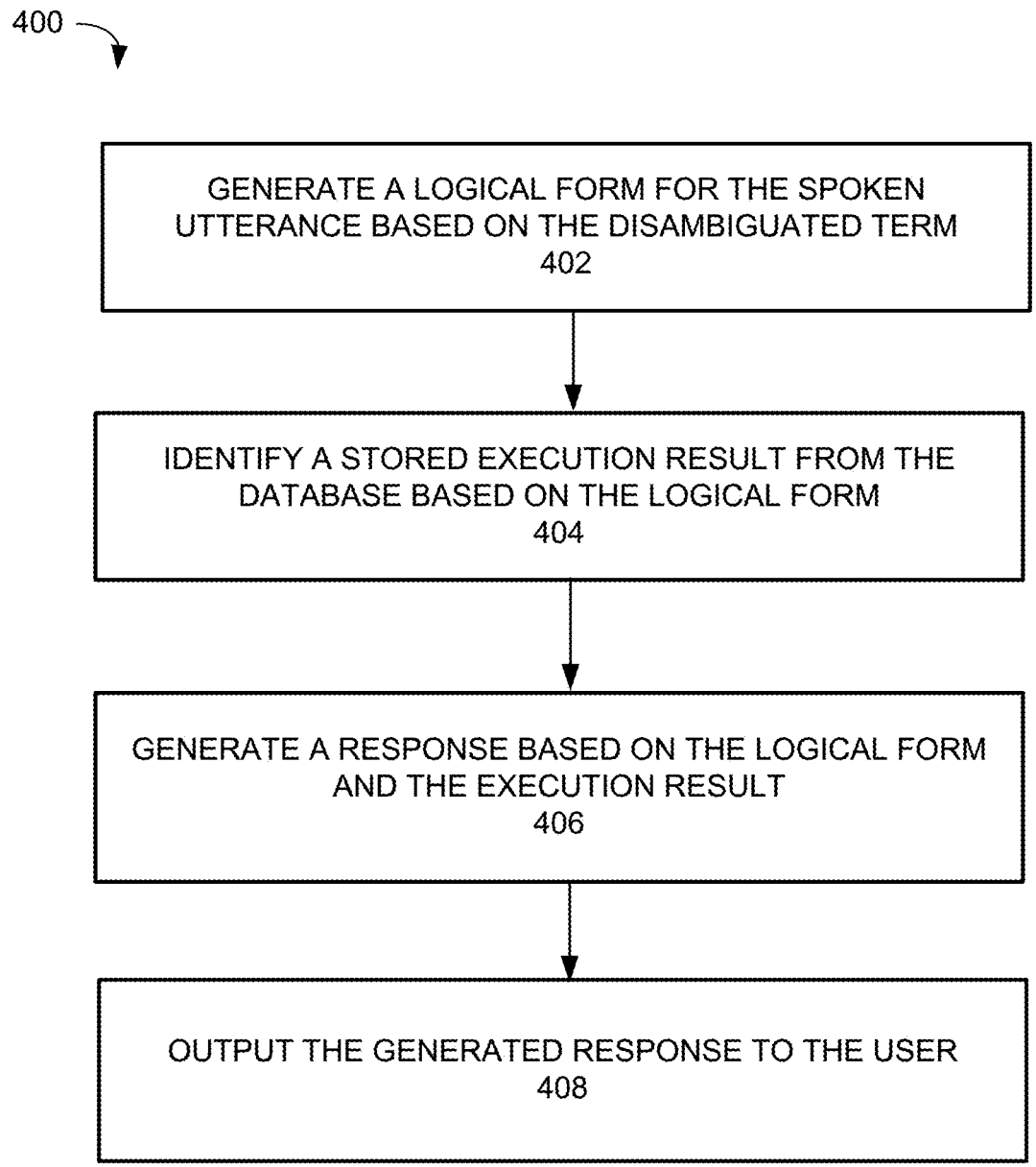
FIG. 4 is a simplified flowchart depicting additional context-based dialog processing techniques according to certain embodiments.

FIG. 4 depicts a simplified flowchart illustrating additional context-based dialog techniques. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by the NLU subsystem 110, the DM subsystem 116, and other components of the dialog system 100 described above. The processing of FIG. 4 may be performed subsequent to the processing of FIG. 3.

At 402, the dialog system generates a logical form for the spoken utterance received at 302 based on the term disambiguated at 310. The NLU subsystem of the dialog system may use the disambiguated term, along with any additional words identified in processing the spoken utterance at 304, in generating the logical form. The logical form may further be generated based on the context level determined at 306. The NLU subsystem (e.g., the semantic parser subsystem 112 of the NLU subsystem 110 of FIG. 1) may use semantic parsing to generate the logical form. Semantic parsing may be executed using a machine learning algorithm such as a recurrent neural network (RNN) or chart parser. The resulting logical form may be in different forms such as lambda calculus, abstract meaning representation (AMR), or a Python or Java expression. (See, e.g., Liang, *Lambda Dependency-Based Compositional Semantics*, arXiv: 1309.4408 (2013); Yin and Neubig, *A Syntactic Neural Model for General-Purpose Code Generation*, arXiv: 1704.01696 (2017); Banarescu et al., *Abstract Meaning*

Representation for Sembanking, Proceedings of 7th Linguistic Annotation Workshop (2013)).

The NLU subsystem 110 may generate the logical form to include the value used to disambiguate the term at 310. For example, the value identifies the user's favorite bar as "Joe's Place." The logical form generated based upon the spoken utterance "What time does my bar open?" may include "Joe's Place" as a slot in the logical form. Alternatively, or additionally, the logical form may include information obtained by the dialog system based on the disambiguated value (e.g., an address, a pointer to information, and so forth).

In some implementations, the SP subsystem 112 generates a logical form that includes context information, which can be used by the DM subsystem 116 and NLG subsystem 118 to generate a response at 408. For example, the logical form may include a pointer to an entry in the appropriate context-level database (e.g., context-level 1 DB 130, context-level 2 DB 132, context-level 3 DB 134, or context-level N DB 136), which can be used to efficiently retrieve information for preparing a response. For example, as the dialog system 100 analyzes the utterance, the dialog system 100 may identify, from a context-level database, an execution result from a prior dialog involving the value at issue. As a specific example, the user is asking for "Maria's phone number." The dialog system has previously identified Maria's phone number in a dialog the previous week and stored the execution result including the phone number to the context-level database. The logical form may include the pointer to the phone number, and/or the phone number itself.

At 404, the dialog system identifies a stored execution result from the database based on the logical form. The dialog system may use a received pointer from the logical form to retrieve the execution result from the database. Continuing the above example, the DM subsystem 116 receives, from the NLU subsystem 110, a logical form including a pointer to Maria's phone number. The DM subsystem 116 may then use the pointer to retrieve Maria's phone number from the context-level database.

At 406, the dialog system generates a response based on the logical form and the execution result. The DM subsystem 116 and/or NLG subsystem 118A may identify information requested by the user and package that information in a natural language form. In some cases, this may involve using the execution result retrieved at 404. Alternatively, or additionally, the DM subsystem 116 may execute an action to retrieve requested information (e.g., via a lookup to another database or an Internet query, by sending an email or text message, and so forth). Continuing the above example with the phone number, the DM subsystem 116 may identify Maria's phone number using the pointer to the context-level database and add words to generate a natural language response—"Maria's number is 515-567-4444. Would you like to call her now?".

Accordingly, the response may be generated based on the disambiguation tasks performed in the processing of FIG. 3. The response may include the results of named entity linking (e.g., next week's weather forecast for Moscow, Id., determined based on the named entity corresponding to Moscow, Id.). Alternatively, or additionally, the response may include the results of slot filling (e.g., information about a flight to New York, determined based on filling the destination city slot with New York). Alternatively, or additionally, the response may include the results of result ranking of the results (e.g., listing several coffee shops in order based on context-based preferences).

In some embodiments, the response may include multiple values retrieved from the database. For example, the dialog system may include two possible choices of a favorite airline in the response, and generate a response such as "Over the last month, Airline A seemed to be your favorite airline, while over the last 6 months Airline B was your favorite. Please select (1) Airline A or (2) Airline B on which you want to make the booking." As another example, the dialog system may rank four coffee shops that are near to the user's current geographic location, using the user's historical preference for a particular chain to put the option in that chain first, where the response includes a list of those four coffee shops in ranked order.

At 408, the dialog system outputs the generated response to the user. The dialog system may provide the response as output (e.g., to a user that provided the input spoken utterance at 202) via the speech output component 124. The dialog system may convert a text response generated by the dialog manager subsystem 116 and the natural language generator subsystem 118 to speech output via the text-to-speech subsystem 120. Alternatively, or additionally, the dialog system may provide the response by causing display of a text response on a display component.

In some aspects, after outputting the response to the user, the dialog system updates the database. The dialog system may store information such as a representation of the spoken utterance (e.g., a text utterance derived from the spoken utterance), the logical form, and the response to the database. This information can then be used to improve the dialog system's understanding of the user's preferences to improve handling of future queries.

FIG. 5 depicts a simplified flowchart illustrating additional context-based dialog techniques. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 5 may be performed by the NLU subsystem 110, the DM subsystem 116, and other components of the dialog system 100 described above. The processing of FIG. 5 may be performed before or after the processing of FIG. 3. For example, the processing of FIG. 5 may generate values stored to the context-level database 200 and used in the processing of FIGS. 3 and 4. Alternatively, or additionally, the processing of FIG. 5 may be performed after the processing of FIGS. 3 and 4 to update the historical data 201 in the context-level database 200. Alternatively, or additionally, the processing of FIG. 5 may be performed as part of the processing of FIG. 3 (e.g., to identify a value at 308).

At 502, the dialog system identifies stored data for a plurality of prior dialogs with the user from the database. As described above with respect to FIG. 2, the context-level database 200 may include historical data 201 stored in association with different users. Based on the user identifier, the historical data for the user may be selected. This historical data may include contextual values, dialog data, dialog metadata, and/or execution results.

In some aspects, the dialog system identifies the stored data for the plurality of prior dialogs from one or more context-level databases. For example, in some cases, the dialog system may generate a value using a selected database (e.g., a short-term context database, medium term context database, or long-term context database). In other cases, the dialog system may retrieve information from multiple context-level databases (e.g., to determine a long-term preference, the dialog system may identify both new data from the short-term context database and older data from the long-term context database).

In some embodiments, the dialog system may further identify additional data that did not arise from a dialog with the dialog session. For example, the dialog system may retrieve information from the user's employer, such as the user's health insurance provider, address, income, coworker's names, and so forth. As another example, the dialog system may obtain information from the user's Internet history, such as sites visited, search terms, and so forth. As another example, the dialog system may obtain Global Positioning System (GPS) data associated with a particular user from a GPS-enabled user device which the user uses to interact with the dialog system. Such information may or may not be stored to the context-level database 200.

At 504, the dialog system analyzes the data identified at 502 to compute the value. The dialog system may use statistical analysis and/or a machine learning model to compute the value identified at 308. As an example, if the user has booked twenty-two flights over a two-year period via the dialog system, then the dialog system may have access to stored data specifying multiple different airlines that the user has selected. The dialog system may perform statistical analysis to identify the most frequently selected airline. In some cases, the dialog system may perform such statistical analysis filtered to particular context-related time period (e.g., by identifying an airline the user has booked the most in the last week). This may be facilitated by using the dialog metadata (208A, 208N) to link user selections to time periods (e.g., by subtracting a dialog metadata vale denoting a time that a particular utterance was received from a current time value). Alternatively, or additionally, the dialog system may perform other types of statistical analysis such as identifying a median value of a set of preferences, a rate of change of preferences, and so forth. In some embodiments, the dialog system may apply a machine learning model to data in the database to predict a value such as a user preference.

In some aspects, the dialog system may compute the value based on an implicit preference. For example, data may be stored indicating that the user selected an item from a list of choices one or more times (e.g., if the user selected a particular gas station from a displayed list multiple times, the dialog system can infer a preference for that gas station, even if the user has not actually uttered the name of the gas station to the dialog system). As another example, the dialog system may use location data to compute a value indicating an implicit preference (e.g., if GPS data indicates that the user has repeatedly shopped at a certain store, then the dialog system may use this information to augment user preferences for stores indicated by spoken input received and stored for the user).

At 506, the dialog system may store the computed value to the database. If the value is indicative of a long-term preference, then the dialog system may store the computed value to a long-term context database and/or with an indicator that the context is long-term. If the value is indicative of a medium-term value (e.g., the name of a song that the user was listening to that morning, the last person called, etc.), then the computed value may be stored to a medium-term context database and/or with an indicator that the context is medium-term. In some aspects, the dialog system may compute the value on the fly—e.g., in the course of identifying the value at 308. In such cases, the value may or may not subsequently be stored to the database (i.e., the value may be computed in real-time rather than retrieved from the database). Alternatively, or additionally, the values may be generated periodically—e.g., on a weekly basis, the processing of FIG. 5 may be performed to generate and/or update a set of key-value pairs stored for a particular user.

The techniques described herein have multiple advantages. Leveraging stored historical information to respond to speech input allows the dialog system to respond more accurately, and without continually asking the user to clarify the same point. This can result in reduced latency in providing output in response to a received query. Further, by storing context information in association with different context levels, the dialog system can speed up the process of providing a response. For example, if the dialog system has determined that information of interest is in one of five different context-level databases, then the dialog system can identify which context-level database is appropriate. The dialog system can then query a smaller set of data (e.g., approximately ⅕ of the amount of data for the example of five databases), resulting in a faster query execution.

Additional reductions in latency and computational resources can be provided by using the context-based databases to retrieve a previously executed result. For instance, if the system has already looked up the lyrics to the user's favorite song, the song lyrics can be quickly retrieved from the contextual database if the user requests the lyrics a second or third time. Accordingly, the techniques described herein can reduce latency and computational resource usage on multiple levels.

The infrastructure described above can be implemented in various different environments including a cloud environment (could be various types of clouds including private, public, and hybrid cloud environments), on-premises environment, a hybrid environment, and the like.

Figure 6:
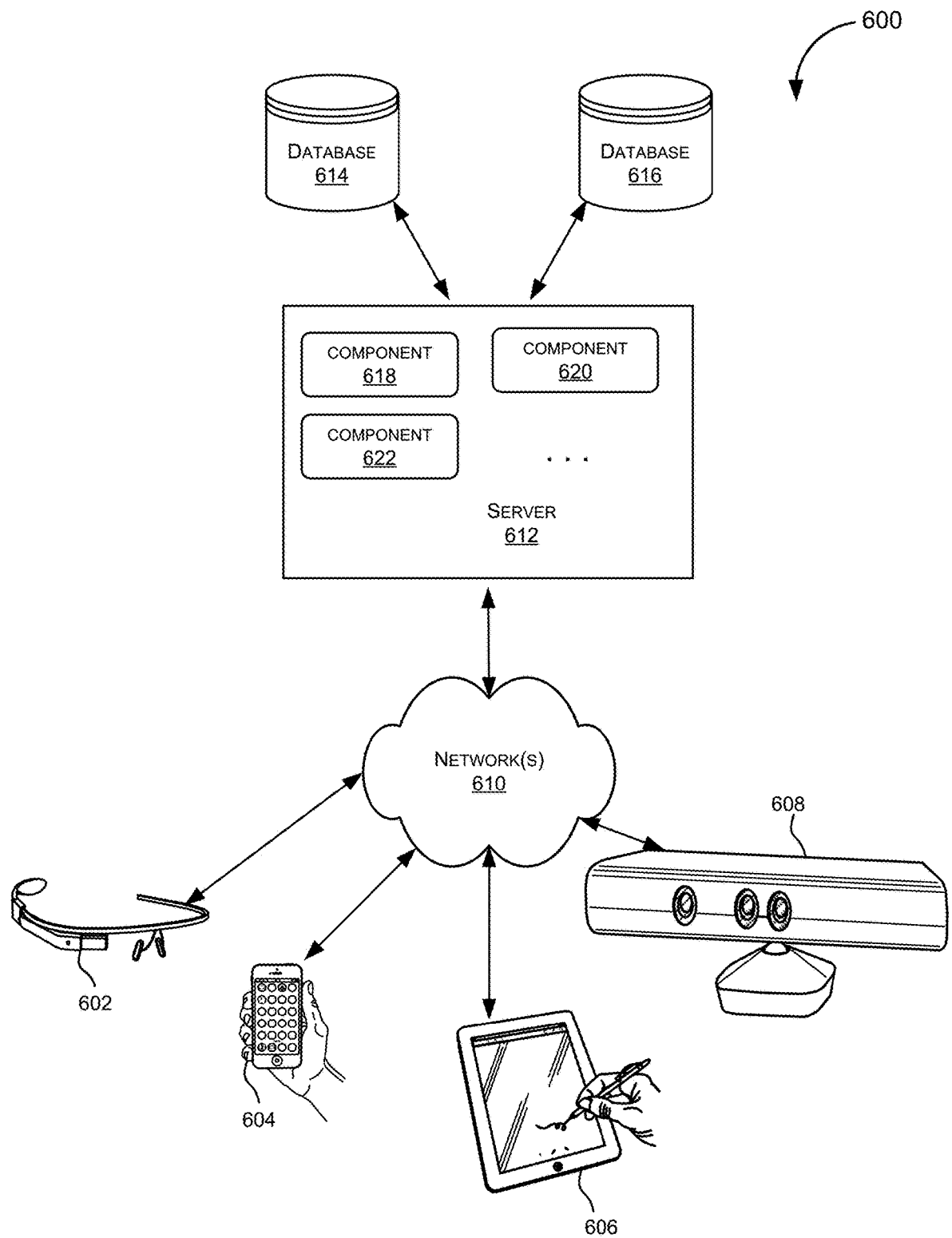
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable executing dialog tasks based on historical context.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to use historical context to influence dialog tasks in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store information such as dialog history. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
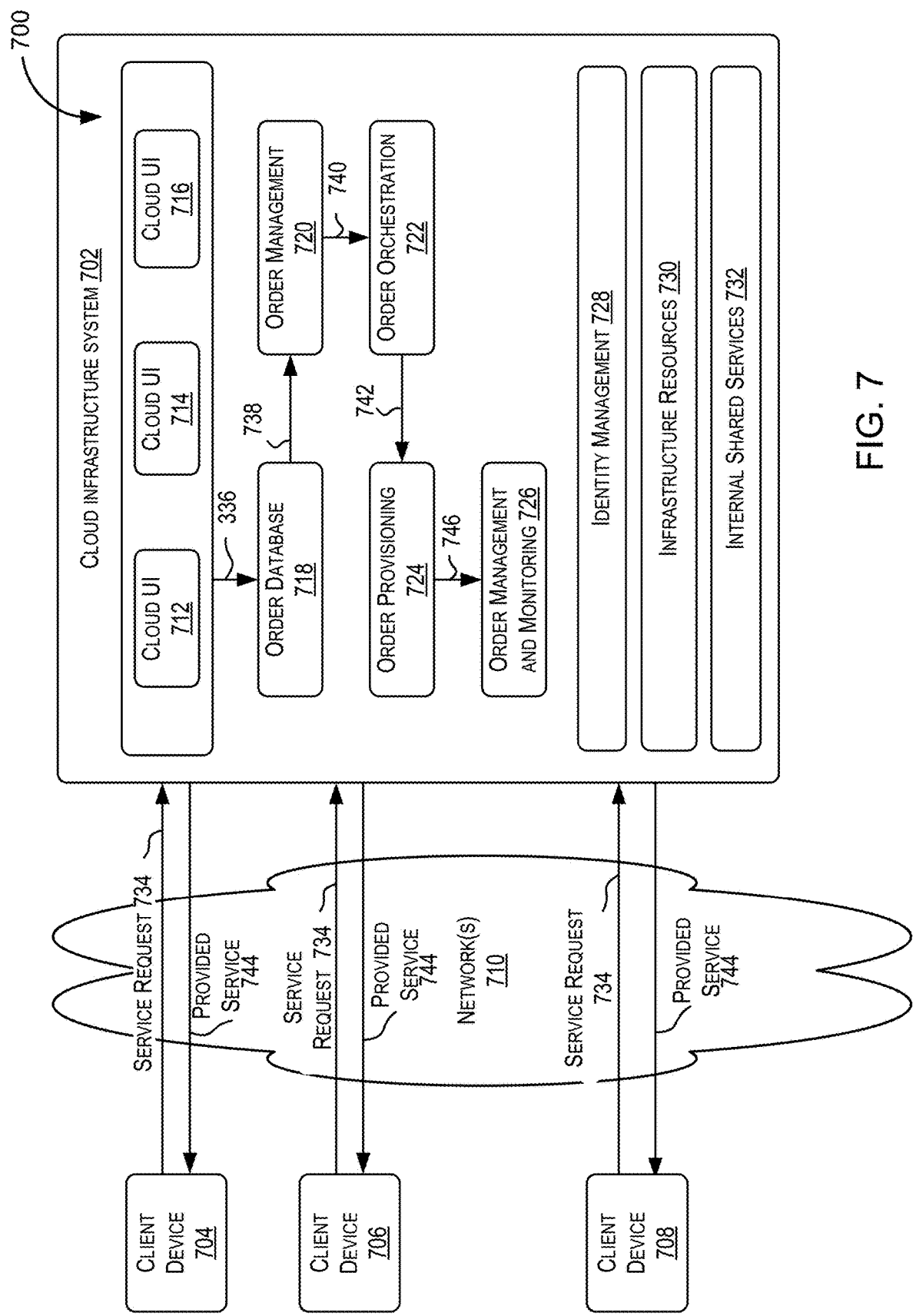
FIG. 7 is a simplified block diagram of a cloud-based system environment in which various storage-related services may be offered as cloud services, in accordance with certain embodiments.

In certain embodiments, the context-based dialog processing functionalities described in this disclosure may be offered as services via a cloud environment. FIG. 7 is a simplified block diagram of a cloud-based system environment in which various context-based dialog processing services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, cloud infrastructure system 702 uses historical context to influence dialog tasks. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 202, 204, 206, and 208 depicted in FIG. 2) and may be capable of operating one or more client applications. A user may use a client device to interact with cloud infrastructure system 702, such as to request a service provided by cloud infrastructure system 702. For example, a user may use a client device to request a context-based dialog processing service described in this disclosure.

In some embodiments, the processing performed by cloud infrastructure system 702 for providing context-based dialog processing services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for identifying an intent based on received speech input. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a context-based dialog processing service offered by cloud infrastructure system 702. As part of the order, the customer may provide speech input identifying a request.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the context-based dialog processing service, the response may include a response generated based on an identified intent.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
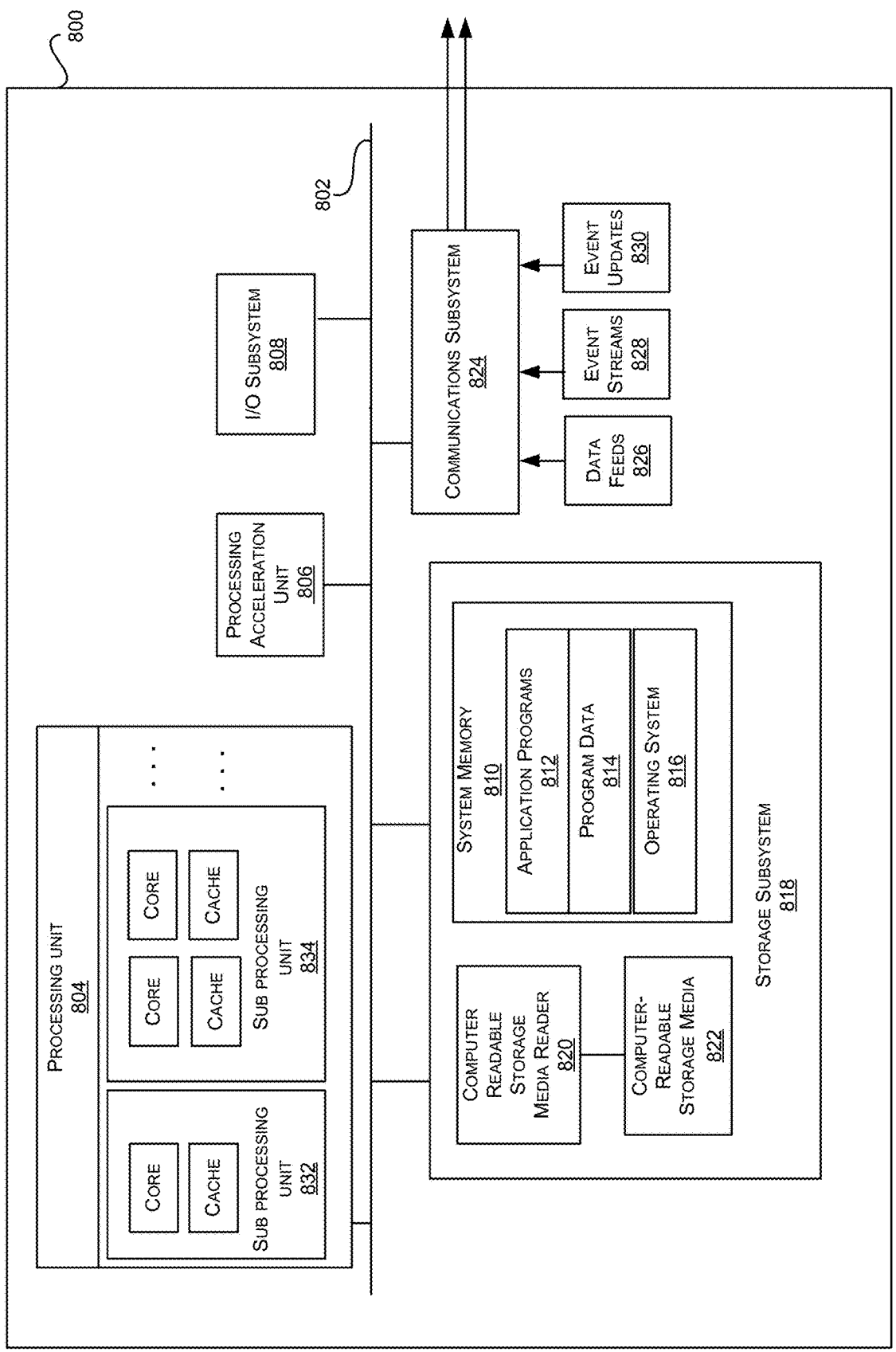
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of the ASR subsystem, NLU subsystem, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to communicate with a database to import contextual information from a client database (e.g., the name of an individual's health insurance provider may be retrieved from a database maintained by the individual's employer).

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims. The modifications include any relevant combination of the disclosed features.

What is claimed is:

1. A method comprising:
receiving, by a dialog system from a user, a spoken utterance;
processing, by the dialog system, the spoken utterance to identify a term for disambiguation;
determining, by the dialog system, a context level, of a plurality of predefined context levels, for the term for disambiguation;
based on the determined context level, identifying, by the dialog system, a value for the term using a database storing a plurality of values for the user in association with the context level, wherein identifying the value includes:
based on the determined context level, selecting the database for the context level, of a plurality of context-level-based databases, and
querying the selected database with an identifier of the user and the term to identify the value; and
disambiguating, by the dialog system, the term using the identified value.

2. The method of claim 1, further comprising:
generating, by the dialog system, a logical form for the spoken utterance based on the disambiguated term;
generating, by the dialog system, a response based on the logical form; and
outputting, by the dialog system, the response to the user.

3. The method of claim 2, further comprising:
identifying, by the dialog system from the database based on the logical form, a stored execution result,
wherein the response is further generated based on the execution result.

4. The method of claim 2, further comprising:
storing, by the dialog system, a representation of the spoken utterance, the logical form, and the response to the database.

5. The method of claim 1, further comprising:
identifying, by the dialog system from the database, stored data for a plurality of prior dialogs with the user; and
analyzing the identified data to compute the value.

6. The method of claim 1, wherein the plurality of predefined context levels include an immediate context, a short-term context, a medium-term context, and a long-term context.

7. A non-transitory computer-readable memory storing a plurality of instructions executable by one or more processors, the plurality of instructions comprising instructions that when executed by the one or more processors cause the one or more processors to perform processing comprising:
receiving a spoken utterance from a user;
processing the spoken utterance to identify a term for disambiguation;
determining a context level, of a plurality of predefined context levels, for the term for disambiguation;
based on the determined context level, identifying a value for the term using a database storing a plurality of values for the user in association with the context level, wherein identifying the value includes:

based on the determined context level, selecting the database for the context level, of a plurality of context-level-based databases, and querying the selected database with an identifier of the user and the term to identify the value; and disambiguating the term using the identified value.

8. The non-transitory computer-readable memory of claim 7, the processing further comprising:

generating a logical form for the spoken utterance based on the disambiguated term;

preparing a response based on the logical form; and outputting the response to the user.

9. The non-transitory computer-readable memory of claim 8, the processing further comprising:

identifying, from the database based on the logical form, a stored execution result, wherein the response is further generated based on the execution result.

10. The non-transitory computer-readable memory of claim 8, the processing further comprising:

storing a representation of the spoken utterance, the logical form, and the response to the database.

11. The non-transitory computer-readable memory of claim 7, the processing further comprising:

identifying, from the database, stored data for a plurality of prior dialogs with the user; and analyzing the identified data to compute the value.

12. The non-transitory computer-readable memory of claim 7, wherein the plurality of predefined context levels include an immediate context, a short-term context, a medium-term context, and a long-term context.

13. A system comprising:

one or more processors;

a memory coupled to the one or more processors, the memory storing a plurality of instructions executable by the one or more processors, the plurality of instructions comprising instructions that when executed by the one or more processors cause the one or more processors to perform processing comprising:

receiving a spoken utterance from a user;

processing the spoken utterance to identify a term for disambiguation;

determining a context level, of a plurality of predefined context levels, for the term for disambiguation;

based on the determined context level, identifying a value for the term using a database storing a plurality of values for the user in association with the context level, wherein identifying the value includes:

based on the determined context level, selecting the database for the context level, of a plurality of context-level-based databases, and querying the selected database with an identifier of the user and the term to identify the value; and disambiguating the term using the identified value.

14. The system of claim 13, the processing further comprising:

generating a logical form for the spoken utterance based on the disambiguated term;

preparing a response based on the logical form; and outputting the response to the user.

15. The system of claim 14, the processing further comprising:

identifying, from the database based on the logical form, a stored execution result, wherein the response is further generated based on the execution result.

16. The system of claim 14, the processing further comprising:

storing a representation of the spoken utterance, the logical form, and the response to the database.

17. The system of claim 13, the processing further comprising:

identifying, from the database, stored data for a plurality of prior dialogs with the user; and analyzing the identified data to compute the value.

18. The system of claim 13, wherein the plurality of predefined context levels include an immediate context, a short-term context, a medium-term context, and a long-term context.

* * * * *